Oct. 23, 1928.
L. W. TIFFANY
1,688,406
PACKAGING MACHINE
Filed June 4, 1924
3 Sheets-Sheet 1
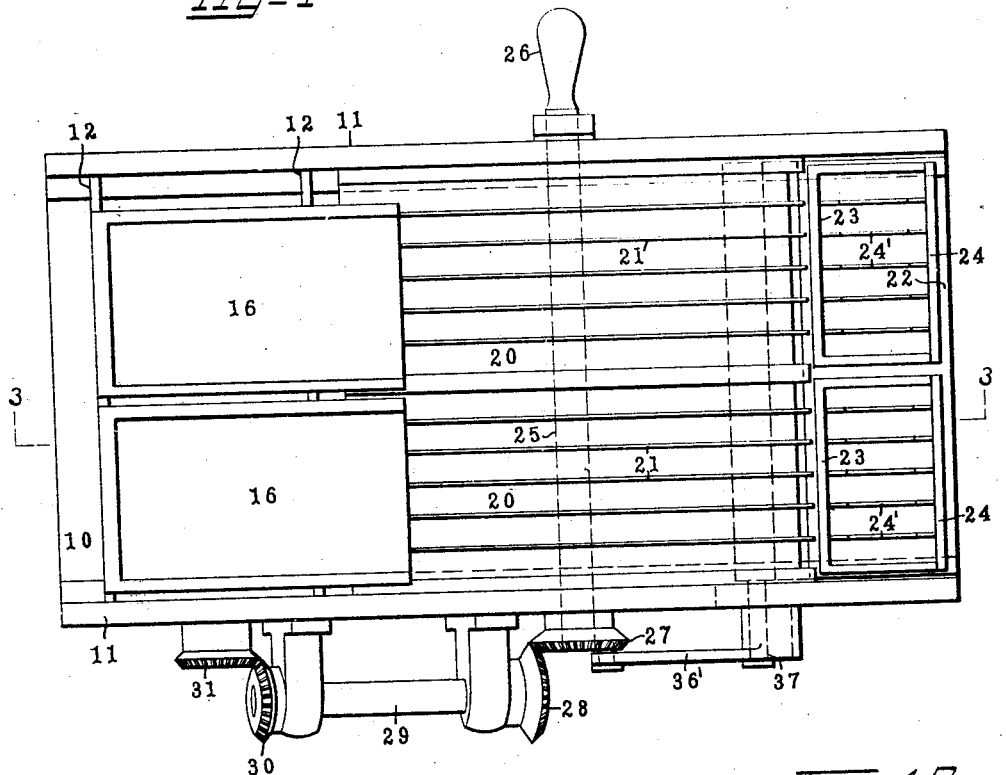
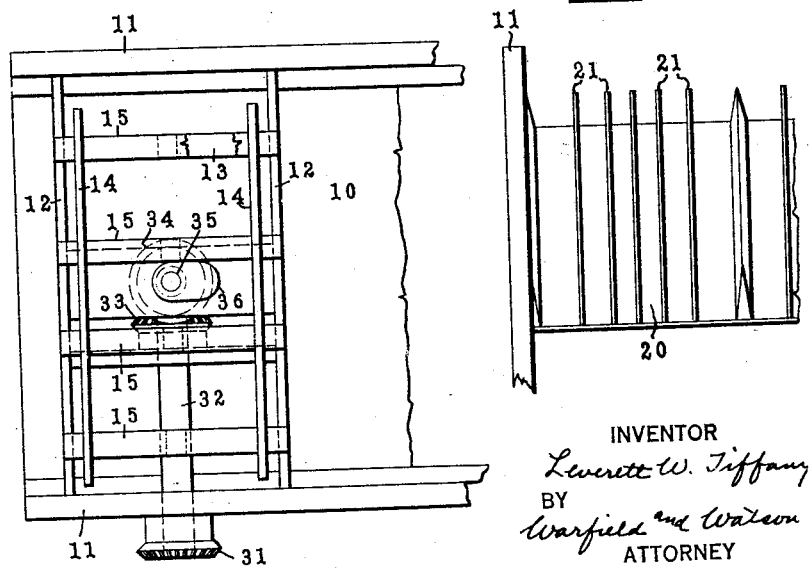
INVENTOR
Leverett W. Tiffany
BY
Warfield and Watson
ATTORNEY Oct. 23, 1928.
L. W. TIFFANY
1,688,406
PACKAGING MACHINE
Filed June 4, 1924    3 Sheets-Sheet 2
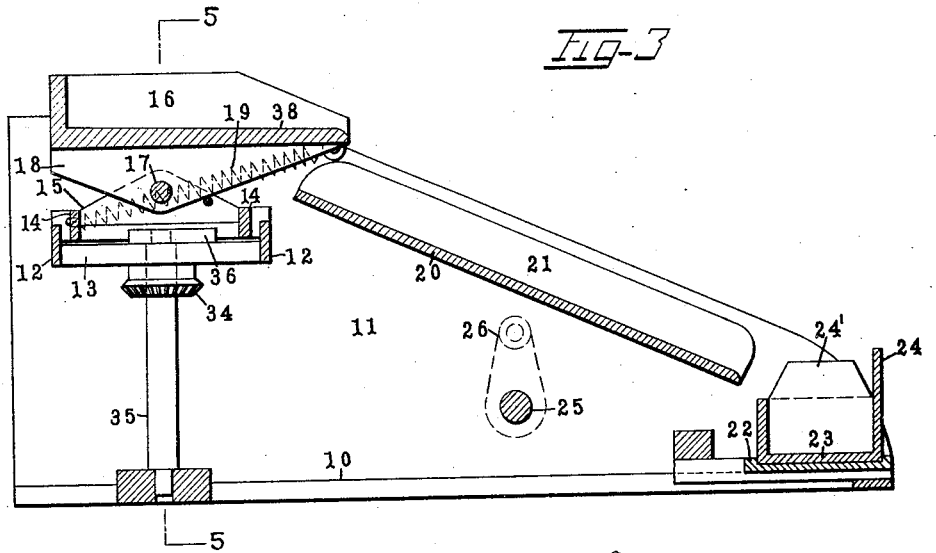
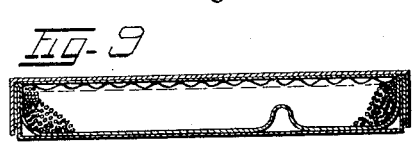
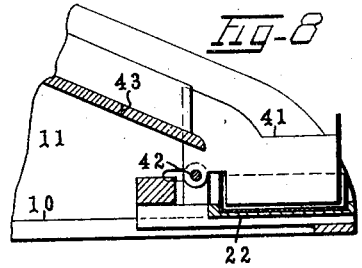
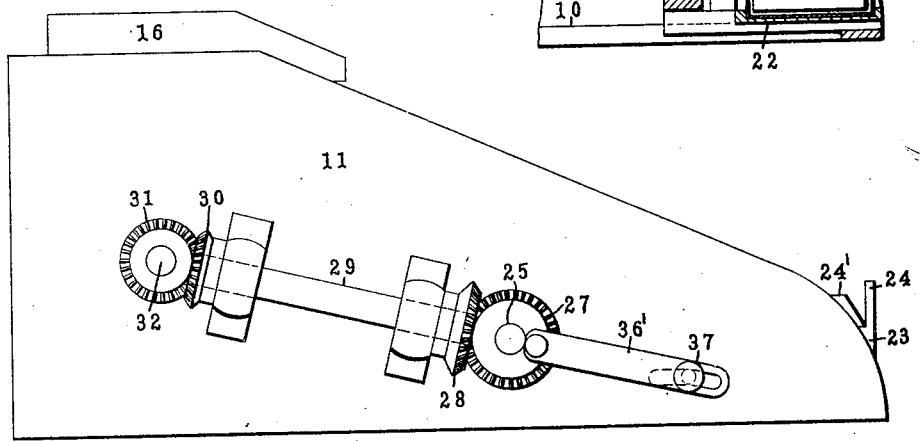
INVENTOR
Leverett W. Tiffany
BY
Warfield and Watson
ATTORNEY Oct. 23, 1928.
L. W. TIFFANY
1,688,406
PACKAGING MACHINE
Filed June 4, 1924   3 Sheets-Sheet 3
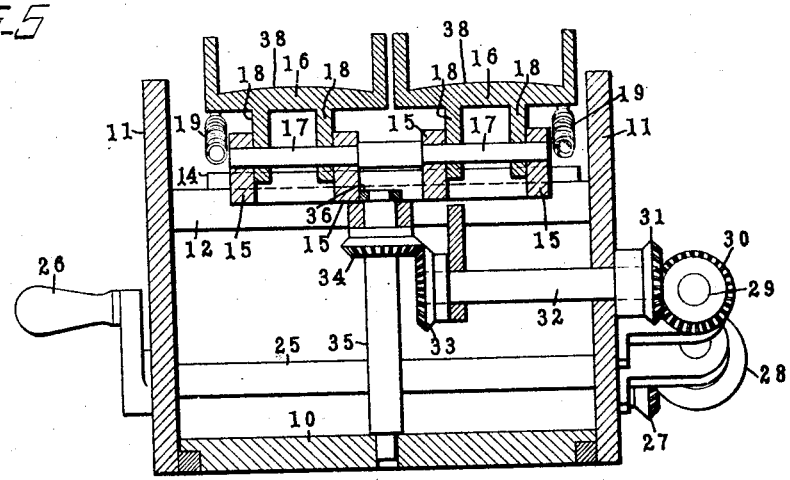
Fig-5
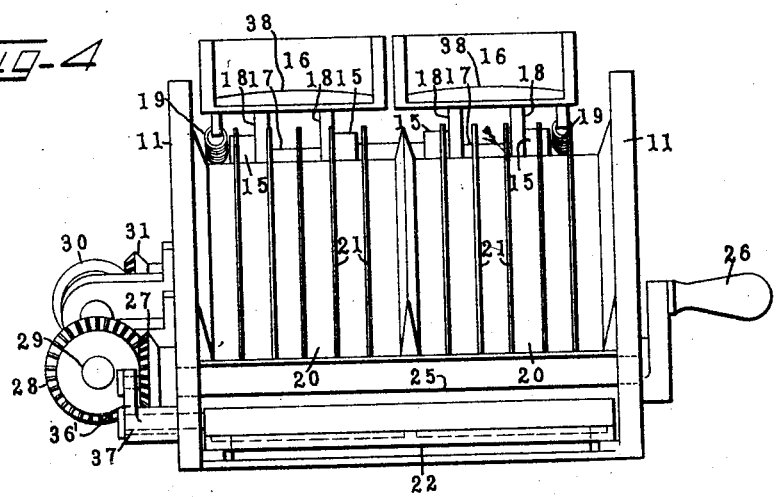
Fig-4
Fig-7
INVENTOR
Leverett W. Tiffany
BY
Warfield and Watson
ATTORNEY Patented Oct. 23, 1928.

1,688,406

UNITED STATES PATENT OFFICE.

LEVERETT W. TIFFANY, OF WINSTED, CONNECTICUT.

PACKAGING MACHINE.

Application filed June 4, 1924. Serial No. 717,673.

This invention relates to a method of assorting articles, as well as to a machine whereby this method may be practiced.

One of the objects accomplished by this invention is that of being able to take a mass of promiscuously arranged individual articles and efficiently dispose these articles within a receptacle or package in such a manner that they will occupy far less space and the package will be less liable to be damaged than has heretofore been the case, aside from the fact that in such disposition they will present a pleasing appearance and be capable of being readily removed from the receptacle body.

A further object is to be predicated to the construction of a machine to accomplish the first mentioned object, which machine may be manipulated by an unskilled attendant in such a manner as to efficiently handle a great number of articles to be packaged.

Another object is that of providing an assorting machine capable of use in connection with the sorting of articles of any desired character, but particularly adapted for use in the handling of pins, so that the latter may be neatly and compactly disposed within a receptacle.

Still another object is that of providing an apparatus of the type specified which will efficiently perform the purposes for which it is intended and which will also be economically and readily manufactured and assembled.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Fig. 1 is a plan view of one form of an assorting machine constructed under the terms of the present invention;

Fig. 2 is a side view thereof;

Fig. 3 is a sectional side view taken along the lines 3—3 of Fig. 1;

Fig. 4 is an end view of the machine;

Fig. 5 is a transverse sectional view taken on the lines 5—5 of Fig. 3;

Fig. 6 is a fragmentary plan of a detail of the operating mechanism;

Fig. 7 is a sectional view of one of the receiving trays;

Fig. 8 is a partly fragmentary sectional side view of a form which the dispensing or delivery end of the machine may take;

Fig. 9 is a sectional side view taken through a package which has been filled by employing a machine of this type; and Fig. 10 is a fragmentary plan view of a form of construction which may be adopted in connection with the runways.

In the illustrated embodiment, the invention has been shown as an assorting machine consisting of two units; each including a hopper, a runway, and a receiving tray. Common to both of these units is a base 10 and side walls 11, which latter have upper edges preferably inclined and support a platform at their uppermost ends. This platform includes the side walls 12 and cross bars 13, and movably mounted upon the latter in a direction transverse of the machine is a carriage 14 having cross bars 15. Hoppers 16 are secured to this carriage in any desirable manner, as for example by means of shafts 17 extending through openings in the cross bars 15 of the carriage, as well as through openings in ribs 18, which are affixed to the bases of the hoppers.

With a view of normally retaining the hoppers in positions at which their bases will incline forwardly and downwardly, or rearwardly and downwardly, any desirable expedient may be resorted to, such as that of using springs 19 which have their inner ends attached to the carriage, their outer ends being secured one to each of the hoppers at points preferably adjacent the outer ends of the latter. By having the bodies of these springs extending in planes slightly to one side of the axis of the shafts 17, it will be appreciated that if either of the hoppers is tilted rearwardly, it will be maintained in this position until it is deliberately swung forwardly and downwardly, in which latter position it will again be retained against accidental movement.

Arranged immediately in advance of the forward or discharging ends of the hoppers are runways, each including an inclined base portion 20, to which upstanding fins or ribs 21 are attached, so that each runway is subdivided into a suitable number of individual chutes extending lengthwise thereof. In turn arranged in advance of the forward or discharge end of the chutes is a second carriage 22, common to both units, and supported by this latter carriage are a plurality of trays 23 corresponding in number to the number of units included in the machine. These trays, while of any desirable shape, are preferably in the nature of receptacles having their outermost side walls higher than the innermost of the same, as has been indicated at 24, and the base of each of these trays is provided with upwardly extending partition members 24' equal in number to the number of ribs 21 forming a part of the unit with which the tray is associated.

It is preferred that the hoppers be given a movement transverse of the machine, and it is likewise preferred that the trays be given a movement longitudinal of the machine. With this in mind a mechanism such as has been illustrated may be employed. This mechanism conveniently includes a rotatable driving shaft 25 extending transversely of the machine body which shaft may be driven in any desirable manner as for example by means of a crank 26. Secured to that end of the shaft which is opposite to the end with which the crank is associated is a gear 27, the teeth of which mesh with the teeth of a corresponding gear 28. This gear is secured to one end of a shaft 29, the opposite end of which carries a gear 30. The teeth of the gear 30 are engaged by the teeth of a gear 31, which is mounted upon a shaft 32 extending into the body of the machine and terminating at a point centrally thereof. At this end, the shaft carries a gear 33, serving to drive a gear 34 carried by a shaft 35. Secured to the upper end of this shaft is an eccentric or crank arm 36, which has its path of movement in a plane between a pair of the cross bars 15 of the first mentioned carriage, and thus it will be obvious that upon the crank 36 being turned the shaft 35 will be correspondingly turned to vibrate the carriage and hoppers carried thereby in a direction transverse of the machine body.

Likewise the trays 23 are moved when the driving shaft 25 is actuated, this movement being accomplished in the example herewith given by attaching one end of a pitman 36' to the outer face of the gear 27 and connecting the opposite end of this element with the secondary carriage 22, this latter attachment being preferably effected by the use of a pin and slot connection 37. Thus, due to the fact that the last named platform is mounted for movement in a direction longitudinal of the machine, it will be appreciated that upon the driving shaft being operated the trays will be given a movement towards and away from the outer edge of the machine, and at the end of each stroke there will occur a period of rest.

In operation, it will be understood that an attendant will initially place the hoppers in a position at which they will tilt rearwardly and in such position will fill each of these receptacles with a predetermined amount of articles to be assorted, as for example, pins. During this operation the machine may or may not be functioning. Subsequently, each of the hoppers is tilted forwardly and downwardly, as has been previously described, care being taken, however, that a tray is in association with the unit which is being operated. Upon the shaft 25 being rotated, it will be appreciated that the hopper will be given a vibratory movement transversely of the machine, and this movement will tend to dispose the pins parallel to each other and with their bodies extending lengthwise of the machine. In this connection, it is of interest to note that it is preferred that the base 38 of the hopper be transversely curved as has best been shown in Figs. 4 and 5, as it has been found that by having this base portion of the shape specified the proper disposition of the articles is greatly facilitated. A continuance of the vibratory movement will obviously result in the articles being discharged from the forward ends of the hoppers and in moving downwardly over the runway. It will be appreciated that if in bridging the gap extant between the hopper and the runway any of these articles become slightly disarranged, the provision of the plurality of chutes will serve to properly arrange the articles relative to the machine body and to one another.

Thus the articles will pass over the runway and be discharged therefrom into the trays, and if in such discharging operation the articles should again tend to become disarranged, this difficulty will also be overcome incident first to the provision of the partitions 24' within each of the trays and secondly due to the fact that the trays are being moved in such a manner as to assure a proper rearranging of articles within the shortest interval of time. From the foregoing it will be understood that the assorted articles are disposed within the trays with their bodies extending parallel to one another and transversely of the tray bodies, these articles obviously lying within the trays in groups due to the provision of the partitions 24'.

While these trays may be any desirable shape, some provision should preferably be made for the proper association and cooperation of the final packaging receptacle with the same. With this in mind and reference being particularly had to Fig. 7, it will be observed that in the present instance each of the tray bodies has its side walls formed with grooves 39 adjacent the upper and inner edges thereof, and the partitions 24' are tapered upwardly from points adjacent the bases of these grooves, and extend above the same a distance substantially equal to the depth of the receptacle within which the articles are to be packaged. Thus, the tray may be removed from the carriage with which it is associated, and a receptacle body 40 may be inverted over the tray in such a manner that its upper side edges rest against the bases of the grooves 39, the partitions 24' extending into the receptacle body 40 and having their outermost edges lying adjacent the base thereof. If now, the tray is quickly inverted the articles disposed therein will be transferred from the tray body to the receptacle, and in this transferring it will be found that the articles will be maintained in their proper relative positions. Subsequently the tray may be returned to the secondary machine carriage and the entire operation may be repeated.

If desired the partitions 24' may be dispensed with but in lieu thereof partition members may be provided (as in Fig. 8) by utilizing a series of plates 41 mounted upon a common shaft 42, which is secured to the carriage 22. Where a construction such as this is utilized, the base 20 providing the runway may be slotted adjacent its lower end as at 43 so as to accommodate and permit all of the plates 41 to be swung upwardly and inwardly away from the tray in order to allow the recepacle 40 to be associated with the latter.

In any event, irrespective of the manner in which the construction of the machine is modified, each of the packages filled thereby will contain articles assorted in such a manner that a relatively limited amount of space will serve to accommodate a mass of articles heretofore occupying a far greater amount of space. Aside from the foregoing, the packaged articles will present a neat appearance and in shipment it will be found that the packages will be far less likely to be damaged than has heretofore been the case.

While the package illustrated in Fig. 9 is embodied in a copending application, it will be understood from the illustration herewith given that it is preferred that a corrugated member or members presenting ribs are utilized in such a manner that their ribbed faces are opposed and extend from the base and lid of the package. Thus, the articles disposed within the body of the same tend to key into the spaces extant between these ribs, and as a consequence a displacement of these articles is prevented, aside from the fact that where a bottom member of the type shown in Fig. 9 is employed, the package when once opened will permit of the ready dispensing or removal of the articles therefrom in a manner outlined in my copending application previously referred to.

Finally referring to Fig. 10, it will be noted that if desired the fins or ribs 21 may be disposed upon the base portion 20 in such a manner that they will be unequally spaced. This may be resorted to in the event that it is found that unequal quantities of articles are moving through adjacent and individual chutes. It will be found in practice that by thus changing the construction a substantially equal amount of articles will be delivered through all chutes and thus an even distribution of the same within the packages will be assured.

From the foregoing it will be understood that the objects of this invention have been accomplished, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A packaging machine, including a hopper adapted to receive a mass of promiscuously disposed articles, means for vibrating said hopper to arrange the articles with their bodies substantially parallel to each other and to effect a discharge of said articles from said hopper, a tray adapted to receive said discharged articles, and means for vibrating said tray to rearrange the articles within the body of the same, said tray and hopper being vibrated in different directions.

2. A packaging machine, including a hopper adapted to receive a mass of promiscuously disposed articles, means for vibrating said hopper to arrange the articles with their bodies substantially parallel to each other and to effect a discharge of said articles from said hopper, a tray adapted to receive said discharged articles, and means for vibrating said tray to rearrange the articles within the body of the same, one of said elements being vibrated transversely of the machine body, the other of the same being vibrated longitudinally thereof.

3. A packaging machine, including a hopper adapted to receive a mass of promiscuously disposed articles, means for vibrating said hopper to arrange the articles with their bodies substantially parallel to each other and to effect a discharge of said articles from said hopper, a tray adapted to receive said discharged articles, and means for vibrating said tray to rearrange the articles within the body of the same, said hopper being vibrated transversely of the machine body, said tray being vibrated longitudinally thereof.

4. A packaging machine, including in combination, means for arranging a mass of promiscuously disposed articles with their bodies substantially parallel to each other, and a tray adapted to contain said articles, said tray being formed with means adapted to accommodate a package, whereby a package may be arranged in juxtaposition to said tray and the latter may be manipulated to effect a transfer of said assorted articles therefrom to said package.

5. A packaging machine, including in combination, means for arranging a mass of promiscuously disposed articles with their bodies substantially parallel to each other, a tray adapted to contain said articles, said tray being formed with means adapted to accommodate a package, whereby a package may be arranged in juxtaposition to said tray and the latter may be manipulated to effect a transfer of said assorted articles therefrom to said package, and means forming a part of said tray for preventing a disarrangement of said articles during said transference.

6. A packaging machine, including in combination, a hopper, a transversely curved convex base portion forming a part thereof, means for moving said hopper to assort articles disposed upon said base and means providing a plurality of chutes extending from said hopper and into all of which the latter is to discharge.

7. A packaging machine, including a mounting member, a hopper disposed upon said mounting member, means providing fixed chutes extending downwardly from said hopper, a tray positioned at the lower ends of said chutes, a mounting member for said tray, and means for vibrating said mounting members, said chutes remaining stationary during such vibration.

8. A packaging machine, including a mounting member, a hopper disposed upon said mounting member, means providing fixed chutes extending downwardly from said hopper, a tray positioned at the lower ends of said chutes, a mounting member for said tray, means for vibrating the hopper mounting member transversely of the machine, and means for vibrating the tray mounting member longitudinally of the machine.

In testimony whereof I affix my signature.

LEVERETT W. TIFFANY.